US007617500B2

(12) United States Patent
Astl et al.

(10) Patent No.: US 7,617,500 B2
(45) Date of Patent: Nov. 10, 2009

(54) GENERIC FRAMEWORK FOR INTEGRATING COMPONENTS WITH DIFFERENT INTERFACES IN AN ENTERPRISE APPLICATION INTEGRATION ENVIRONMENT

(75) Inventors: Kenneth Astl, San Antonio, TX (US); Atul Ravindra Daherkar, Foster City, CA (US); Manoj Khangaonkar, Foster City, CA (US); Edwin V. Sapugay, San Bruno, CA (US); Larry Hwang-Chi Tung, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 11/133,929

(22) Filed: May 20, 2005

(65) Prior Publication Data

US 2006/0265719 A1 Nov. 23, 2006

(51) Int. Cl.
*G06F 13/00* (2006.01)
(52) U.S. Cl. .................. 719/311; 719/328; 719/331; 717/102
(58) Field of Classification Search .............. 719/330, 719/331, 332, 311, 328; 717/102, 111
See application file for complete search history.

(56) References Cited

U.S. PATENT DOCUMENTS

| 5,915,113 | A | 6/1999 | McDonald et al. ......... 395/702 |
|---|---|---|---|
| 6,088,028 | A | 7/2000 | Gipalo ..................... 345/333 |
| 6,781,607 | B1 | 8/2004 | Benham ................... 345/744 |
| 6,859,212 | B2 | 2/2005 | Kumar et al. ............. 345/744 |
| 6,950,860 | B1* | 9/2005 | Farah et al. ............... 709/218 |
| 2002/0057290 | A1 | 5/2002 | Wilkinson et al. ........ 345/744 |
| 2002/0196276 | A1 | 12/2002 | Corl et al. ................ 345/744 |
| 2003/0105884 | A1 | 6/2003 | Upton ...................... 709/318 |
| 2005/0066284 | A1 | 3/2005 | Ho et al. .................. 715/762 |
| 2005/0203892 | A1* | 9/2005 | Wesley et al. ............... 707/3 |

\* cited by examiner

*Primary Examiner*—Andy Ho
(74) *Attorney, Agent, or Firm*—Yee & Associates, P.C.; Prentiss W. Johnson

(57) ABSTRACT

A method, system, and computer program code for integrating components with different interfaces in an enterprise application integration environment. When an enterprise application is assembled, a user may try to wire a component to another component in the enterprise. However, if the reference on the source component does not match the interface on the target component, the components cannot be wired together. In this situation, the user is prompted to introduce an interface mediation component between the source and target application components. The mediation component comprises an interface matching the reference on the source component and a reference matching the interface on the target component. The mediation component mediates the different interfaces at runtime by binding an operation in the source component to an operation in the target component, and performing a parameter mediation of parameters in the first operation to parameters in the second operation.

36 Claims, 12 Drawing Sheets

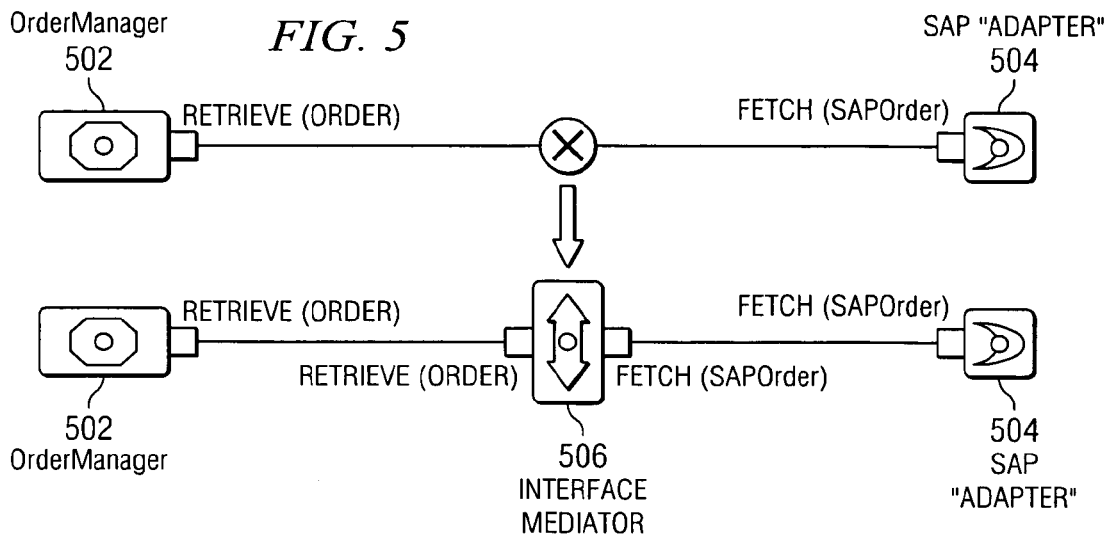

```
<?xml version="1.0" encoding="UTF-8"?>
<schema xmlns="http://www.w3.org/2001/XMLSchema" xmlns:med="http://www.ibm.com/xmlns/
      prod/websphere/wbiserver/ift/6.0.0" xmlns:scdl="http://www.ibm.com/xmlns/
      prod/websphere/scdl/6.0.0" targetNamespace="http://www.ibm.com/xmlns/prod/
      websphere/wbiserver/ift/6.0.0">
   <import namespace="http://www.ibm.com/xmlns/prod/websphere/scdl/6.0.0"/>
   <!-- Mediation implementation -->
   <complexType name="MediationImplementation">
      <complexContent>
         <extension base="scdl:Implementation">
            <attribute name="ifmFile" type="string"/>  ~604
         </extension>
      </complexContent>
   </complexType>
</schema>
```
602

FIG. 20

```
package com.ibm.ws.jservice.mediation;
import com.ibm.websphere.jservice.JServiceRuntimeException;
public class MediationRuntimeException extends JServiceRuntimeException {
   public MediationRuntimeException() {
      super();
   }
   public MediationRuntimeException(String message) {
      super(message);
   }
   public MediationRuntimeException(Throwable cause) {
      super(cause);
   }
   public MediationRuntimeException(String message, Throwable cause) {
```

FIG. 7

```xml
<?xml version="1.0" encoding="UTF-8"?>
<scdl:component name="MyMediationComponent"
      xmlns:med= "http://www.ibm.com/xmlns/prod/websphere/wbiserver/ift/6.0.0"
      xmlns:scdl="http://www.ibm.com/xmlns/prod/websphere/scdl/v6.0.0/"
      xmlns:xsi="http://www.w3.org/2001/XMLSchema-instance"
   <interfaces>
      <interface xsi:type="wsdl:WSDLPortType"
          portType="eis:Generic2EISProductMediatorPortType"/>
   </interfaces>
   <references>
      <reference name="SapAdapter" target="com/clipsandtacks/scm/sap/
              imports/ProductUpdate">
         <interface xsi:type="wsdl:WSDLPortType"
             portType="sapAdapter:SapAdapterProductPortType"/>
      </reference>
   </references>
   <implementation xsi:type="med:MediationImplementation"
             ifmFile="myMediation.ifm"/>
</scdl:component>
```

FIG. 13

```xml
<?xml version="1.0" encoding="UTF-8"?>
<med:interfaceMediation xmlns:med="http://www.ibm.com/xmlns/prod/websphere/
            wbiserver/ifm/6.0.0" xmlns:xsi="http://www.w3.org/2001/
            XMLSchema-instance"
   <operationBinding source="createOrder" target="generateOrder">
      <!-- Forward/request direction interface mediation-->
      <parameterMediation xsi:type="med:passthru">
         <parameterBinding>
            <from location="source" paramType="input" param="orderName" />
            <to location="target" paramType="input" param="orderNM" />
         </parameterBinding>
      <!-- Response direction interface mediation-->
      </parameterMediation>
      <parameterMediation xsi:type="med:passthru">
         <parameterBinding>
            <from location=" target " paramType="output" param="orderCD" />
            <to location="source" paramType="output" param="orderCode" />
         </parameterBinding>
      </parameterMediation>
   </operationBinding>
</med:interfaceMediation>
```

FIG. 8A

```xml
<?xml version="1.0" encoding="UTF-8"?>
<schema xmlns="http://www.w3.org/2001/XMLSchema"
              xmlns:med="http://www.ibm.com/xmlns/prod/websphere/wbiserver/ifm/6.0.0"
              xmlns:scdl="http://www.ibm.com/xmlns/prod/websphere/scdl/6.0.0"
targetNamespace="http://www.ibm.com/xmlns/prod/websphere/wbiserver/ifm/6.0.0">
     <import namespace="http://www.ibm.com/xmlns/prod/websphere/scdl/6.0.0"
              schemaLocation="scdl.xsd"/>
     <element name="interfaceMediation" type="med:interfaceMediation"/>
     <complexType name="interfaceMediation">
          <sequence>
               <element name="interfaces" type="scdl:InterfaceSet"/>
               <element name="references" type="scdl:ReferenceSet"/>
               <element name="operationBinding" type="med:operationBinding"
                    maxOccurs="unbounded"/>               ╲
          </sequence>                                    802
          <attribute name="name" type="NCName" use="required"/>
          <attribute name="targetNamespace" type="anyURI" use="required"/>
     </complexType>
     <complexType name="operationBinding">
          <sequence>
               <element maxOccurs="unbounded" minOccurs="0" name="parameterMediation"
                    type="med:parameterMediation"/>
          </sequence>
          <attribute name="source" type="string"/>  ╱ 806
          <attribute name="target" type="string"/> ╲ 808
     </complexType>
     <complexType name="parameterMediation">
          <sequence>
               <element maxOccurs="unbounded" name="parameterBinding"
                    type="med:parameterBinding"/>                ╲
          </sequence>                                           804
          <attribute name="name" type="string" use="optional"/>
          <attribute name="srcFaultType" type="QName" use="optional"/>
          <attribute name="tgtFaultType" type="QName" use="optional"/>
     </complexType>
     <complexType name="parameterBinding">
          <sequence>
               <element name="from" type="med:fromLocation"/>
               <element maxOccurs="unbounded" name="to" type="med:toLocation"/>
          </sequence>
     </complexType>
     <complexType name="fromLocation">
          <attribute name="location" type="med:tLocationType"/>
          <attribute name="paramType" type="med:tParamType" use="required"/>
          <attribute name="param" type="string" use="required"/>
          <attribute name="value" type="string" use="optional"/>
     </complexType>
     <complexType name="toLocation">
```

TO FIG. 8B

FIG. 8B
FROM FIG. 8A

```
            <attribute name="location" type="med:tLocationType"/>
            <attribute name="paramType" type="med:tParamType" use="required"/>
            <attribute name="param" type="string" use="required"/>
    </complexType>
    <simpleType name="tParamType">
            <restriction base="string">
                    <enumeration value="input"/>
                    <enumeration value="output"/>
                    <enumeration value="fault"/>
            </restriction>
    </simpleType>
    <simpleType name="tLocationType">
            <restriction base="string">
                    <enumeration value="source"/>
                    <enumeration value="intermediate"/>
                    <enumeration value="target"/>
            </restriction>
    </simpleType>
    <complexType name="boTransform">          ⟋ 810
            <complexContent>
                    <extension base="med:parameterMediation">
                            <attribute name="mapname" type="QName" use="required"/>
                    </extension>
            </complexContent>
    </complexType>
    <complexType name="javaSnippet">          ⟋ 812
            <complexContent>
                    <extension base="med:parameterMediation">
                            <attribute name="javaclass" type="string" use="required"/>
                    </extension>
            </complexContent>
    </complexType>
    <complexType name="setValue">
            <complexContent>                   ⟍ 814
                    <extension base="med:parameterMediation"/>

</complexContent>
    </complexType>
    <complexType name="passThru">   ⟍ 816
            <complexContent>
                    <extension base="med:parameterMediation"/>
            </complexContent>
    </complexType>
</schema>
```

```
<interfaceMediation
        xmlns="http://www.ibm.com/xmlns/prod/websphere/wbiserver/
ifm/6.0.0"
        xmlns:med="http://www.ibm.com/xmlns/prod/websphere/
wbiserver/ifm/6.0.0"
        xmlns:sapAdapter="http://www.abc.com/scm/sap/imports/
SAPAdapter"
        xmlns:eis="http://www.abc.com/scm/interfaces/
Generic2EISProductMediator/"
>                                            1102
<operationBinding source="applyUpdate" target="doUpdate>
   <!-- Forward/request direction interface mediation-->
   <parameterMediation xsi:type="med:boTransform"   1104
           mapname="eis:Generic2SAPMap">
     <parameterBinding>
        <from location="source" paramType="input"
     param="ProductCategoryBG"/>
        <to location="intermediate" paramType="input" param="p0"/>
     </parameterBinding>
     <parameterBinding>
```

*FIG. 11*

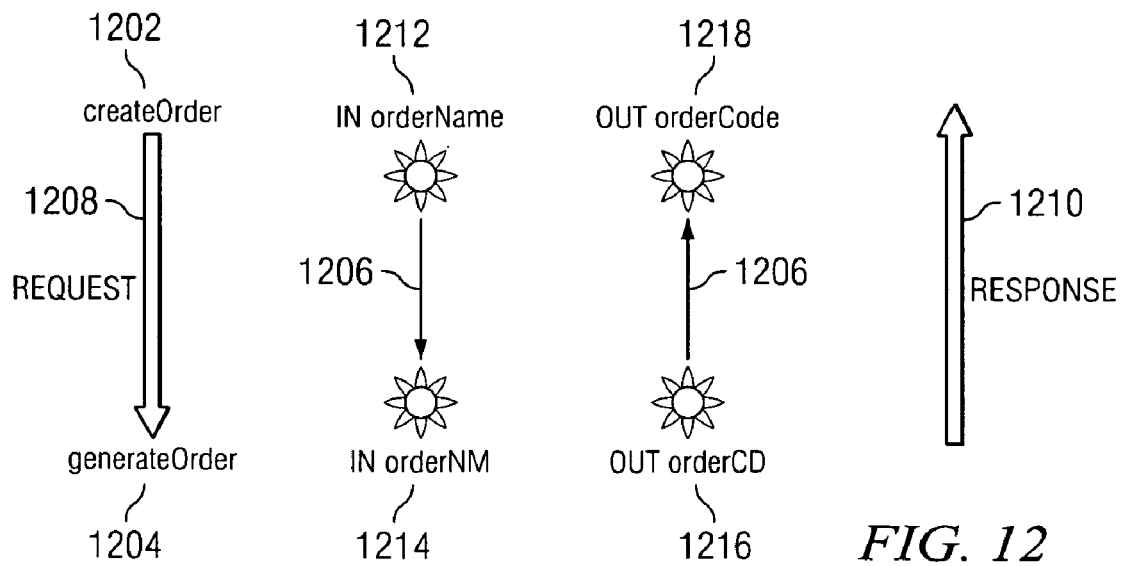

*FIG. 12*

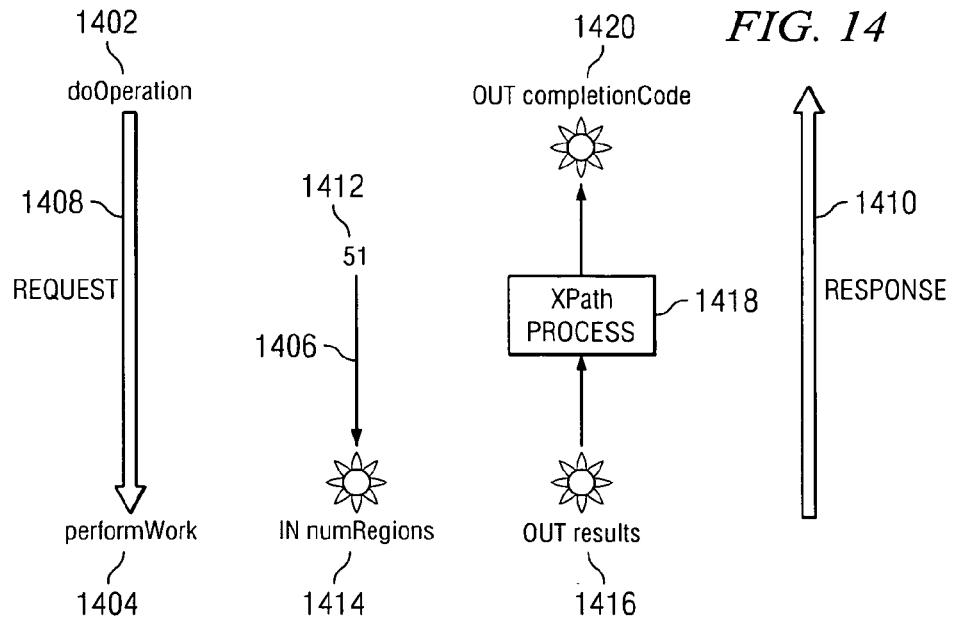

```
<?xml version="1.0" encoding="UTF-8"?>
<med:interfaceMediation xmlns:med="http://www.ibm.com/xmlns/prod/websphere/wbiserver/ifm/6.0.0"
                xmlns:xsi="http://www.w3.org/2001/XMLSchema-instance" >
  <operationBinding source="doOperation" target="performWork">
    <!-- Request direction -->
    <parameterMediation xsi:type="med:setValue">
      <parameterBinding>      1506      1502
        <from location="intermediate" value="51"/>
        <to location="target" paramType="input" param="numRegions"/>
      </parameterBinding>
    </parameterMediation>    1508                          1504
    <!-- Response direction -->
    <parameterMediation xsi:type="med:setValue">
      <parameterBinding>
        <from location="target" paramType="output" param="results" value="/results/result/code/value"/>
        <to location="source" paramType="output" param="completionCode"/>
      </parameterBinding>
    </parameterMediation>
  </operationBinding>
</med:interfaceMediation>
```

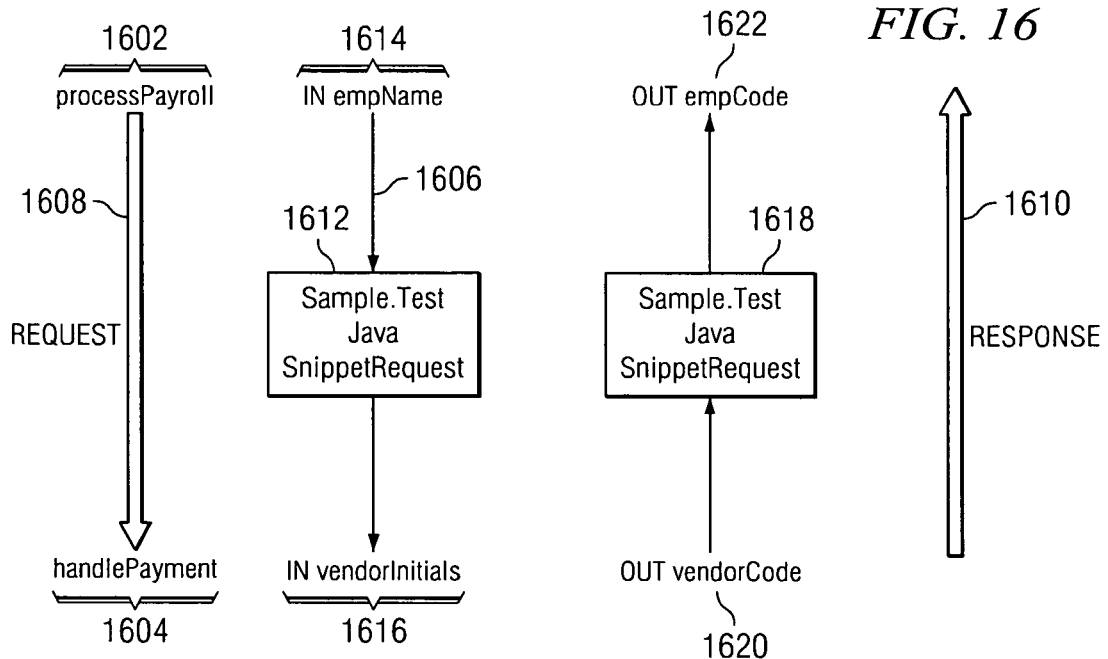

```
<?xml version="1.0" encoding="UTF-8"?>

<med:interfaceMediation
         xmlns:med="http://www.ibm.com/xmlns/prod/websphere/wbiserver/ift/6.0.0"
         xmlns:xsi="http://www.w3.org/2001/XMLSchema-instance">       1704
    <operationBinding source="processPayroll" target="handlePayment">
             <parameterMediation type="med:javaSnippet" transformName=
    1702         "sample.javaSnippetTestRequest">
             <parameterBinding>
         <from location="source" paramType="input" param="empName"/>
         <to location="target" paramType="input" param="vendorInitials" />
             </parameterBinding>
                 </parameterMediation>
<!-- Reverse/reply direction interface mediation -->
             <parameterMediation type="med:javaSnippet" transformName=
                    "sample.javaSnippetTestReply">
             <parameterBinding>
         <from location="target" paramType="output" param="vendorCode" />
         <to location="source" paramType="output" param="empCode" />
             </parameterBinding>
                 </parameterMediation>
       </operationBinding>
    </med:interfaceMediation>
```

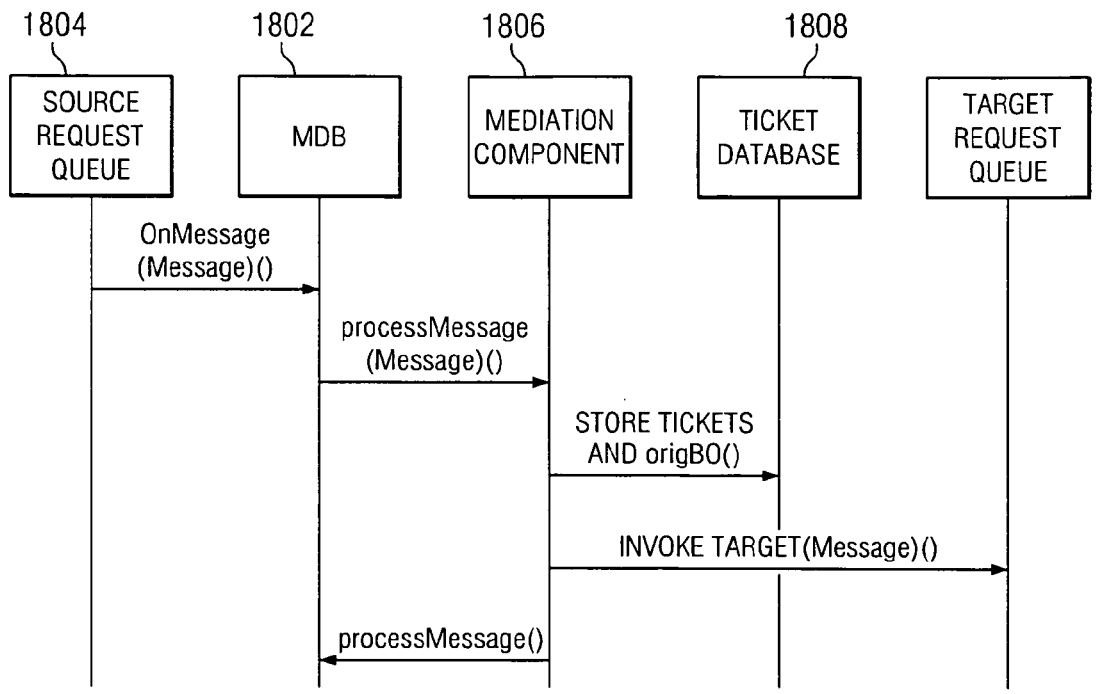
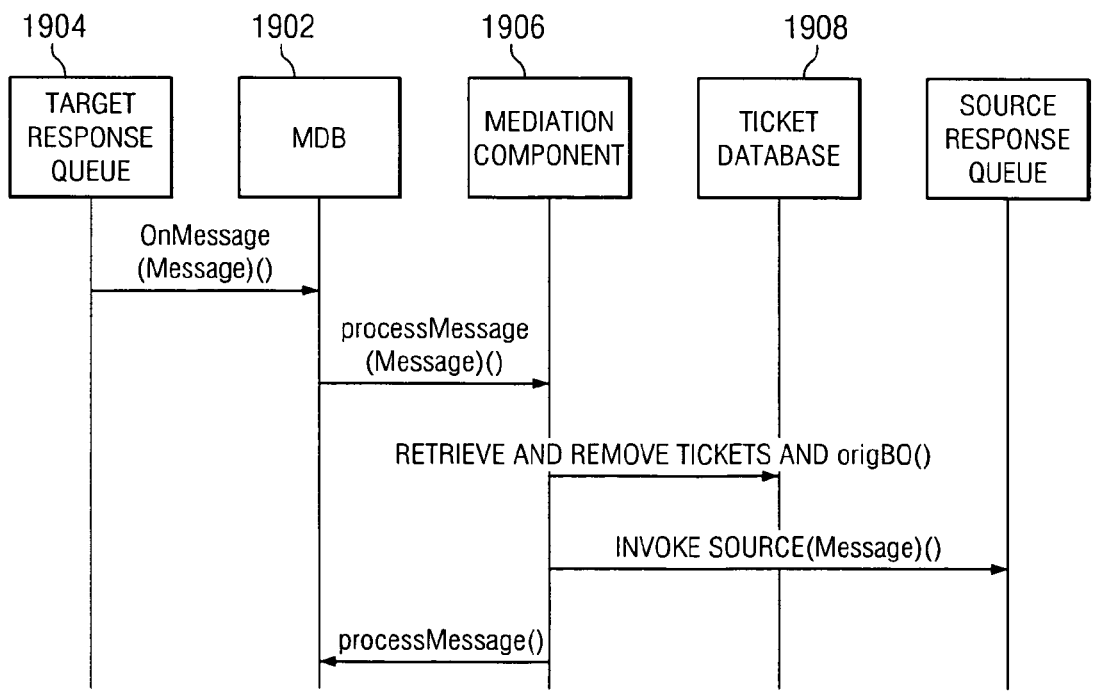

GENERIC FRAMEWORK FOR INTEGRATING COMPONENTS WITH DIFFERENT INTERFACES IN AN ENTERPRISE APPLICATION INTEGRATION ENVIRONMENT

BACKGROUND OF THE INVENTION

1. Technical Field:

The present invention relates generally to an integrated application environment in a network data processing system, and in particular, the present invention is related to a generic framework for integrating components with different interfaces in an enterprise application integration environment.

2. Description of Related Art:

In an integrated application environment, an integration broker integrates different types of applications and shares business objects among these applications. Application components describe their contracts with other components using interfaces and references. An interface specifies what operations a component supports and the input/output details for each operation. A reference specifies the interface with which a component will communicate. The interface may be viewed as an "inbound" contract, and the reference may be viewed as an outbound contract. If the interface reference for one component, component A, does not contain a match for the interface exposed by component B, these applications are not compatible as the components will not be able to communicate with each another.

Consequently, there is a fundamental need for integration brokers to have at least one mechanism that enables, despite disparities in the components' respective interfaces, the various pieces of the integration puzzle to be 'glued' together to form an integrated solution/whole. Although existing solutions in the current art do provide mechanisms that allow for integrating incompatible components, these solutions have several drawbacks. Current methods require that developers write custom code when components with different interfaces need to be integrated. Thus, every time a user has two components with dissimilar interfaces needing to be integrated, a programmer must write custom code to be able to integrate these components. This process is not only time consuming and laborious, but it is also expensive from a cost or dollars perspective. In addition, the custom code may contain errors, the effect of which may require additional time and effort to remedy.

Therefore, it would be advantageous to have an improved system and method for integrating components with different interfaces without requiring custom code to be written.

SUMMARY OF THE INVENTION

The present invention provides a method, system, and computer program code for integrating components with different interfaces in an enterprise application integration environment. When an enterprise application is assembled, a user may try to wire the application to another application in the enterprise. However, if the reference on the source application component does not match the interface on the target application component, the applications cannot be wired together. In this situation, the user may be prompted to introduce an interface mediation component between the source and target components. The interface mediation component enables wiring of the source component to the target component. The mediation component comprises an interface matching the reference on the source component and a reference matching the interface on the target component. The mediation component mediates the different interfaces at runtime by binding an operation in the source component to an operation in the target component and performing a parameter mediation of parameters in the source component to parameters in the target component.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram illustrating an exemplary mediation component interposed between application components in accordance with an illustrative embodiment of the present invention;

FIG. 6 illustrates a schema for a mediation component kind in accordance with an illustrative embodiment of the present invention;

FIG. 7 is a diagram illustrating a sample mediation component kind in accordance with an illustrative embodiment of the present invention;

FIGS. 8A-8B illustrate a schema for mediation metadata in accordance with an illustrative embodiment of the present invention;

FIG. 11 illustrates how the exemplary BO transform mediation in FIG. 10 may be described in the IFM file in accordance with an illustrative embodiment of the present invention;

FIG. 12 is a diagram illustrating an exemplary pass-through mediation in accordance with an illustrative embodiment of the present invention;

FIG. 13 illustrates how the pass-through mediation in FIG. 12 may be described in the IFM file in accordance with an illustrative embodiment of the present invention;

FIG. 14 is a diagram illustrating an exemplary setValue mediation in accordance with an illustrative embodiment of the present invention;

FIG. 15 illustrates how the exemplary setValue mediation in FIG. 14 may be described in the IFM file in accordance with an illustrative embodiment of the present invention;

FIG. 16 is a diagram illustrating an exemplary Java snippet mediation in accordance with an illustrative embodiment of the present invention;

FIG. 17 illustrates how the exemplary Java snippet mediation in FIG. 16 may be described in the IFM file in accordance with an illustrative embodiment of the present invention;

FIGS. 18-19 are interaction diagrams illustrating components involved for asynchronous calls to be handled through the mediation component for the request and the response in accordance with an illustrative embodiment of the present invention;

FIG. 20 illustrates a mediation exception in accordance with an illustrative embodiment of the present invention.

DETAILED DESCRIPTION OF THE PREFERRED EMBODIMENT

Figure 1:
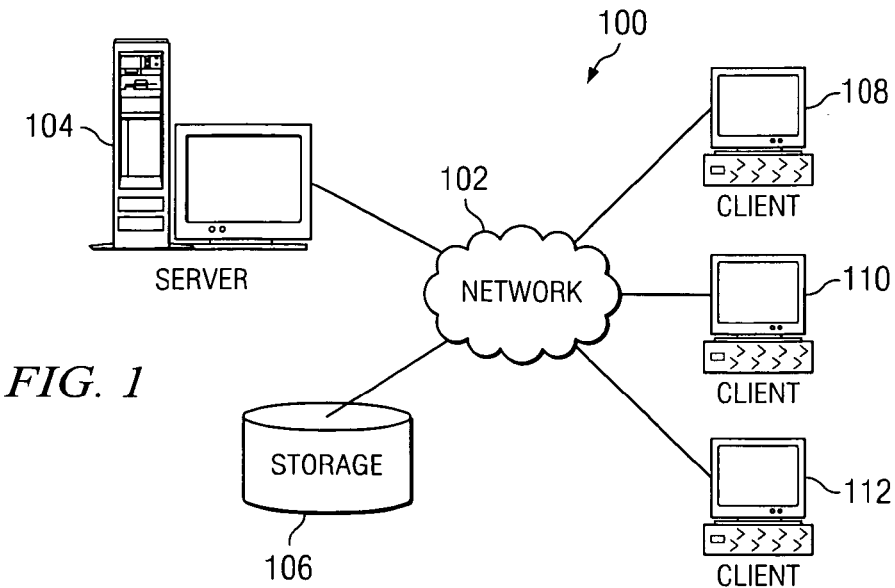
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the present invention.

Figure 2:
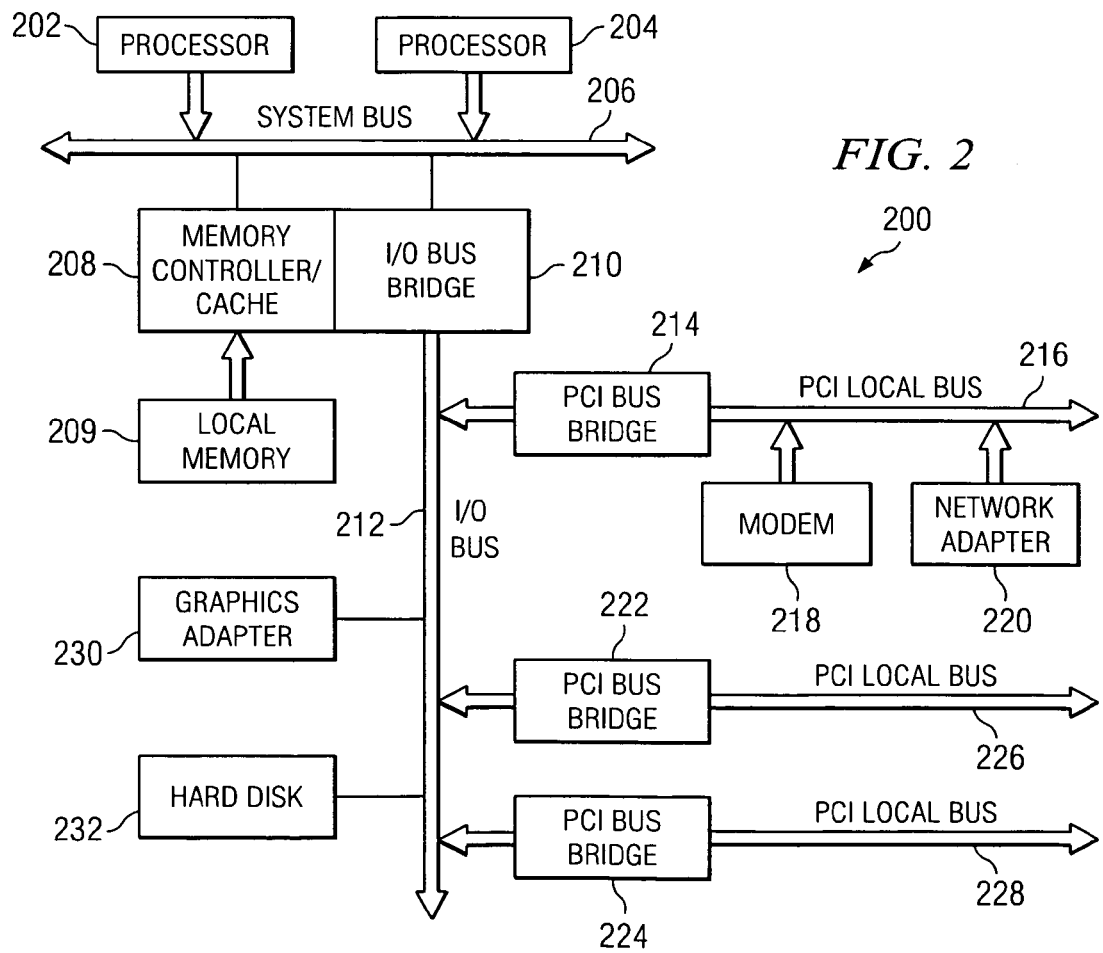
FIG. 2 is a block diagram of a data processing system that may be implemented as a server in accordance with an illustrative embodiment of the present invention.

Referring to FIG. 2, a block diagram of a data processing system that may be implemented as a server, such as server 104 in FIG. 1, is depicted in accordance with an illustrative embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. Memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
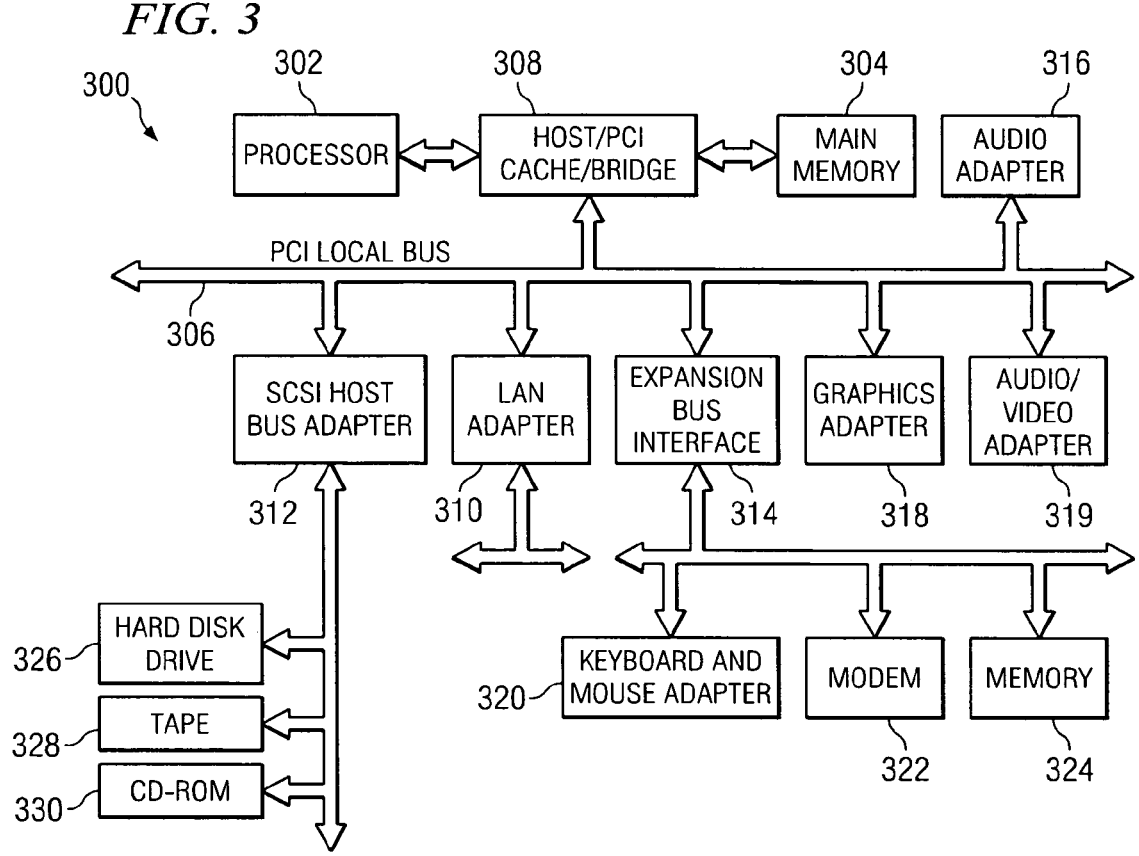
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object-oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand-held computer in addition to taking the form of a PDA. Data processing system 300 also may be a kiosk or a Web appliance.

The present invention provides a system and method for integrating components with different interfaces in an enterprise application integration environment. The present invention may be used to resolve interface disparities across components within a given module. In situations where two components cannot be connected or "wired" together due to incompatible interfaces (e.g., if the reference interface on one component is different than the interface exposed by another component), the mechanism of the present invention interposes an interface mediation component between the components to enable this wiring. If a user attempts to connect two components with incompatible interfaces, the user interface (UI) may prompt the user to create a mediation component definition for the needed integration. Although the illustrative aspects of the present invention are described below in terms of a service component architecture (SCA), these aspects of the present invention are not limited to SCA and may be applied to any similar architecture.

When interface mediation is needed, an interface mediation component may be created for each pair of interfaces to be mediated. For example, if using SCA, the interface mediation component may be created using Service Component Declaration Language (SCDL). SCDL is used to describe SCA components using XML. The interface mediator is metadata based, and the transformations may be defined in extensible markup language (XML) files. The use of metadata enables integration of components without the need to write custom code. This enables business users to perform the integration, without requiring experienced programmers. The metadata may be generated using GUI tools. The interface mediation component comprises an interface that matches the reference interface on the source component, as well as a reference interface that matches the interface on the target component.

The interface mediation component references the interface mediation file (IFM) to use for the mediation. The schema for the IFM file is described below in FIG. 8. One IFM file is referenced in each mediation component. When an interface mediation component is created, an IFM file is created which specifies the operations to mediate, the type of parameter mediation, the parameters to mediate, the map input and output ports to use, and the operation and Parameter bindings.

Once the interface mediation is created and the IFM file defined, SCA wires may be created to wire together the source component references with the mediation interfaces. The interface mediation component references may be wired to the target component interfaces. As this wiring may be standard SCA wiring, the interface mediation component does not introduced any special type of wiring.

The newly created interface mediation component may then be validated by applying rules to the mediation component. For example, validation may be used to generate warnings that the interface, reference, parameters, faults, or specified maps and map ports are missing, that not all required parameters are bound, etc. A validator may be invoked once the mediation component and the IFM files are created.

The interface mediation component reconciles the differences across component interfaces by performing transformations of operations and parameters from a source component to a target component. Transformations are supported at an interface level, operation level, and parameter level. The interface mediation comprises of one or more operationBindings, and each operationBinding comprises of zero or more parameterMediations. Each parameterMediation comprises of one or more parameterBinding elements.

The interface mediation binds each operation in the source interface with an operation in the target interface. An operation binding describes how an operation in the source interface is bound with an operation in the target interface. The operation binding may include a source attribute identifying the source component's operation from which to mediate, and a destination attribute identifying the target component's operation to which to mediate.

Parameter mediations map parameters in the source operation to those in the target operation. A parameter mediation is used to bind a set of source component input (or output/fault) parameters to a set of target component input (or output/fault) parameters. A parameter mediation may be composed of zero or more parameter bindings. The interface mediation component may copy parameters from the source operation and pass these down as parameters to the target operation (or back up to the source operation in the case of output parameters and faults).

The interface mediation component may mediate incompatible interfaces at runtime. The operation name and parameters will be transformed so that a source component reference invocation with one interface type may call a target component with another interface type. Four different types of mediations are supported: BO Transform, passThru, setValue, and Java snippet, each of which will be described further in FIGS. 10-17 below. Some of these mediations invoke specialized services for transformations to transform parameters as necessary, such as map and relationship services (e.g., WebSphere Business Integration (WBI) Mapping Service).

The interface mediation component of the present invention does not include any specific policies, but works with existing policies.

Figure 4:
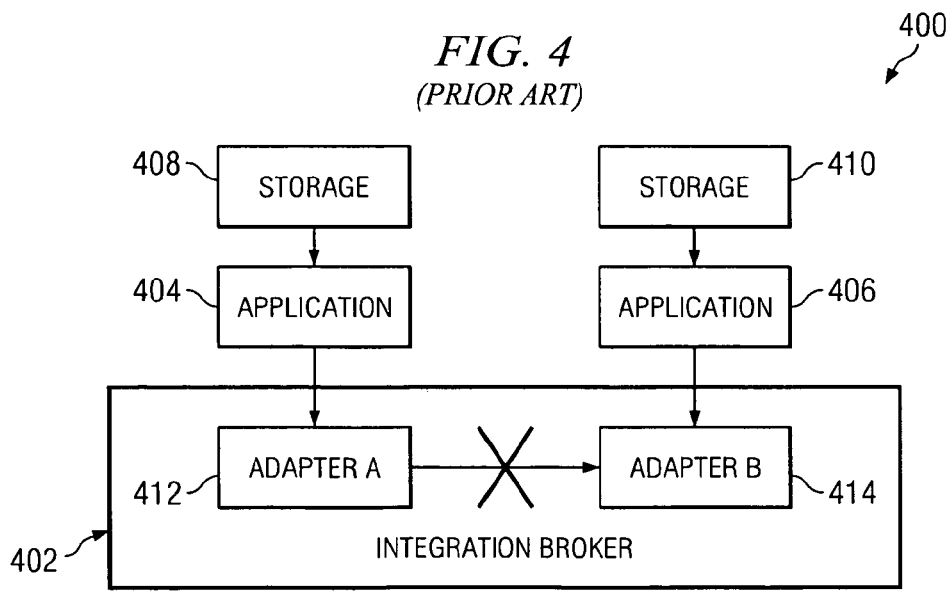
FIG. 4 is a diagram illustrating a known integrated application environment.

Turning now to FIG. 4, a diagram illustrating a known integrated application environment is shown. As depicted in FIG. 4, integration application environment 400 includes integration broker 402, which provides services for transfer of data in application specific business objects among applications 404 and 406. Applications A 404 and B 406 may maintain data in vendor specific databases, such as storage 408 and 410, respectively.

When a source application, such as application A 404, receives data, such as a new customer address, the new customer address is transformed into an application specific business object. In order to update the data in application B 406, this data may sent from application A 404 to application B 406 via adapters 412 and 414 in integration broker 402. Adapters 412 and 414 are employed to transform the application specific objects into formats understood by the respective applications. However, if a reference interface on source application 404 does not match the interface exposed by target application 406, this updated data is not accessible to target application B 406, as attempts by a user to wire adapters 412 and 414 together will be unsuccessful.

The present invention addresses this problem in the current art by introducing an interface mediation component between source application 404 and target application 406. The interface mediation component enables the different interfaces to be integrated. As shown in FIG. 5, an exemplary mediation component may be interposed between SCA components in accordance with an illustrative embodiment of the present invention. OrderManager component 502 and SAPAdapter component 504 in FIG. 5 may be a source component and a target component, such as source component 404 and target component 406 in FIG. 4.

In this illustrative example, a user needs to wire to application components, OrderManager 502 and SAPAdapter 504 together. However, as FIG. 5 illustrates, this wiring will be unsuccessful since the reference interface of Order Manager 502 cannot be wired to the interface of SAPAdapter 504 because the interfaces do not match. For instance, the method names for each component are not the same, and the parameter types for each component are different. When interface mediation component 506 of the present invention is interposed between OrderManager 502 and SAPAdapter 504, the interface mediation component acts as a bridge so these two components can be 'wired' together via the interface intermediary.

In one illustrative embodiment, the interface mediation component is an SCA component and has the following restrictions. The interface mediator may only have one SCDL interface, one SCDL reference, and must adhere to policy restrictions and guidelines. The restrictions imply that if a source component is wired to the interface mediator, a separate interface mediation component will be needed for each reference on the source component. Similarly, if a user wants to wire a target component that has several interfaces, a separate interface mediation component will be needed for each interface defined on the target component.

FIGS. 6-8 illustrate a schema for a mediation component kind, a sample of the mediation component kind, and a schema for mediation metadata in accordance with an illustrative embodiment of the present invention. A mediation component kind facilitates the interaction between incompatible requesting and providing components. A mediation component is an instance of the mediation component kind. The interface mediation component may be defined using two schemas: an SCDL schema which describes the mediation component and the interface mediation (IFM) file to use, and an IFM schema which describes the operation bindings and the parameter mediations. FIG. 6 illustrates an SCDL schema for a mediation component kind in accordance with an illustrative embodiment of the present invention. As shown, MediationImplementation type 602 extends the SCDL component kind to include the interface mediation component which adds an attribute ifmFile 604.

In FIG. 7, an exemplary mediation component kind in accordance with an illustrative embodiment of the present invention is shown. The mediation component kind defines the interfaces and references like any other SCDL component. However, the mediation component kind also specifies the IFM file to use in the mediation. For example, mediation component kind 700 defines the implementation to be of type MediationImplementation 702 and includes the additional attribute ifmFile 704 with a value equal to "myMediation.ifm". In mediation component kind 700, interfaces defined in the mediation component kind are shown to match the source component's reference interfaces, and references defined in the mediation component match the target component's interfaces. Therefore, at runtime, the interfaces may be the incoming mediation component calls and the references may be the outgoing mediation component calls.

FIGS. 8A-8B illustrate an XML schema for mediation metadata in accordance with an illustrative embodiment of the present invention. In particular, FIGS. 8A-8B show XML schema 800 which defines a structure and set of rules for the operation bindings and parameter mediations used to bind a source and target components' operations. The XML schema specifies the structure and rules for the content of the IFM file.

As shown, schema 800 includes operationBinding element 802 and parameterBinding element 804. Operation binding element 802 identifies source attribute 806, which identifies a source component operation from which to mediate. Operation binding element 802 also identifies target attribute 808, which identifies a target component operation to which to mediate. ParameterBinding element 804 identifies parameters to be bound from a source component input (or output) to a target component input (or output) for the operation. ParameterBinding element 804 also identifies different mediation types (boTransform 810, javaSnippet 812, setValue 814, and passThru 816) to be used in the mediation.

Figure 9:
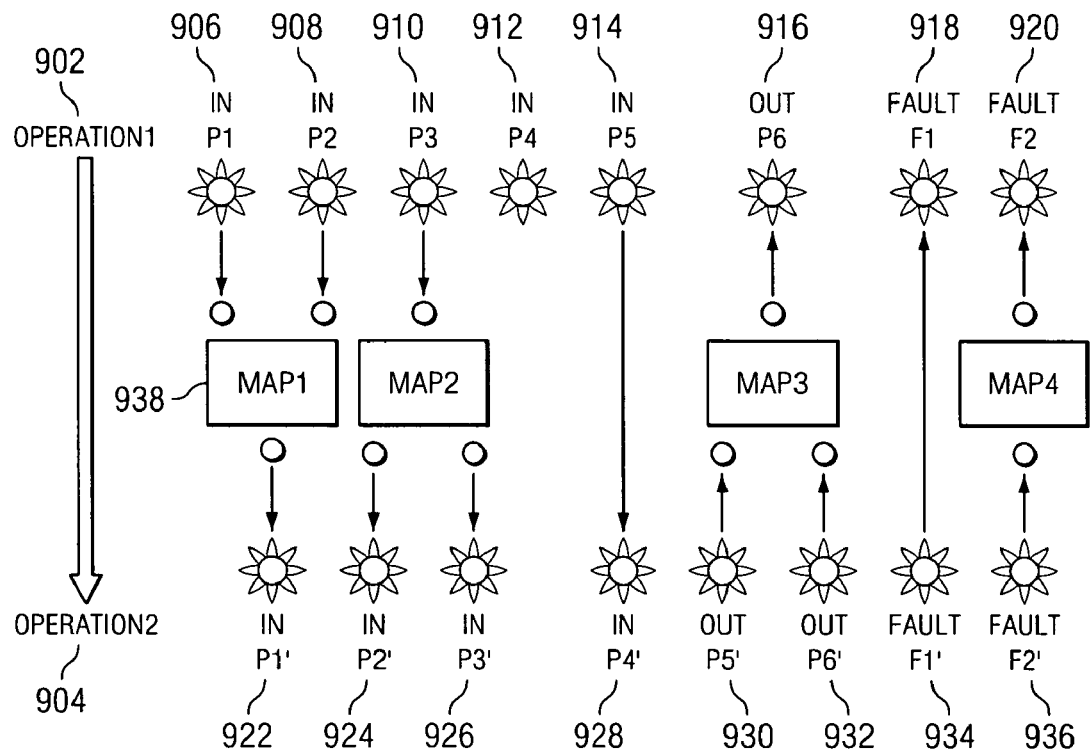
FIG. 9 is a diagram illustrating an exemplary mediation in accordance with an illustrative embodiment of the present invention.

FIG. 9 is a diagram illustrating how an operation in one interface may be bound to an operation in another interface in accordance with an illustrative embodiment of the present invention. Interface mediation comprises one or more operations that are mediated. For example, as shown in FIG. 9, when operation1 902 is called in the source component's reference, the interface mediator calls the target component's operation2 904.

As mentioned previously, an interface mediation may be composed of one or more operation bindings. Each operation binding may map a single source operation to a single operation. The interface mediation component binds each operation (e.g., operation1 902) in the source interface with an operation (e.g., operation2 904) in the target interface. For example, if a source component has an applyUpdate operation that is bound to a target component's doUpdate operation, the IFM file may specify an operation binding in the following manner:

```
<interfaceMediation
...
    <operationBinding source="applyUpdate"
    target="doUpdate>
...
    </operationBinding>
...
</interfaceMediation>
```

An operation binding may include zero or more parameter mediations. Each parameter mediation contains one or more parameter binding elements, such as parameters 906-936, which are used to bind a single parameter from one location to another. As shown, source component input parameters p1 906 and p2 908 are assigned to two map inputs in map1 938. Map1 938 has a single output that is assigned to target component input parameter p1' 922. Although only one output is shown, it should be noted that map1 938 may have been bound to two target component output/fault parameters and two source component output/fault parameters.

Parameter mediations may specify "from" and "to" parameters elements. For example, a parameter may comprise a location attribute, which can be one of three values that signify the component with which the parameter is associated.

For instance, the location attribute "source" may indicate the source component, "intermediate" may indicate the intermediary (e.g., map1 938), and "target" indicates the destination component. A parameter may also comprise a parameter mediation type attribute (paramType) which specifies the type of parameter (e.g., input, output, or fault). It should be noted that a map port may also be specified as a parameter described in a component interface operation. A parameter attribute (param) may also be used to identify the name of the parameter or Web Service Definition Language (WSDL) part to which to apply the mediation. A single "from" parameter may be bound to multiple "to" parameters.

Parameters may be referenced as a "to" element once for output returns and once for fault returns across all parameter bindings. In addition, source input parameters do not need to be mediated; therefore, they do not need to be referenced. For example, this situation is shown by the source operation operation1 902 and parameter p4 912. Likewise, target output parameters do not need to be mediated; therefore, they do not need to be referenced.

ers are of types that are supported by the underlying mediation. The interface mediation component of the present invention supports four types of parameter mediations—boTransform, setValue, passThru, and JavaSnippet. Each of these types extend the base parameterMediation type. The first parameter mediation, boTransform, is supported when the source and target components' parameters are of a service data object (SDO), business object (BO), or business group (BG) type. boTransform invokes a map service to perform the transformation. Source parameters p1 906, p2 908, p3 910, and p6 916 use this type of parameter mediation. The setValue parameter mediation supports Java primitive types and SDOs. SetValue sets the target component's parameter to a fixed value or to the result of an XPath expression applied to the source parameter specified. The passThru and JavaSnippet parameter mediations support all Java types. PassThru allows the parameter to pass unchanged from the source to the target component. Source parameter p5 914 and fault f1 918 use this type of parameter mediation. JavaSnippet specifies that a parameter should be processed by a user provided Java class.

Figure 10:
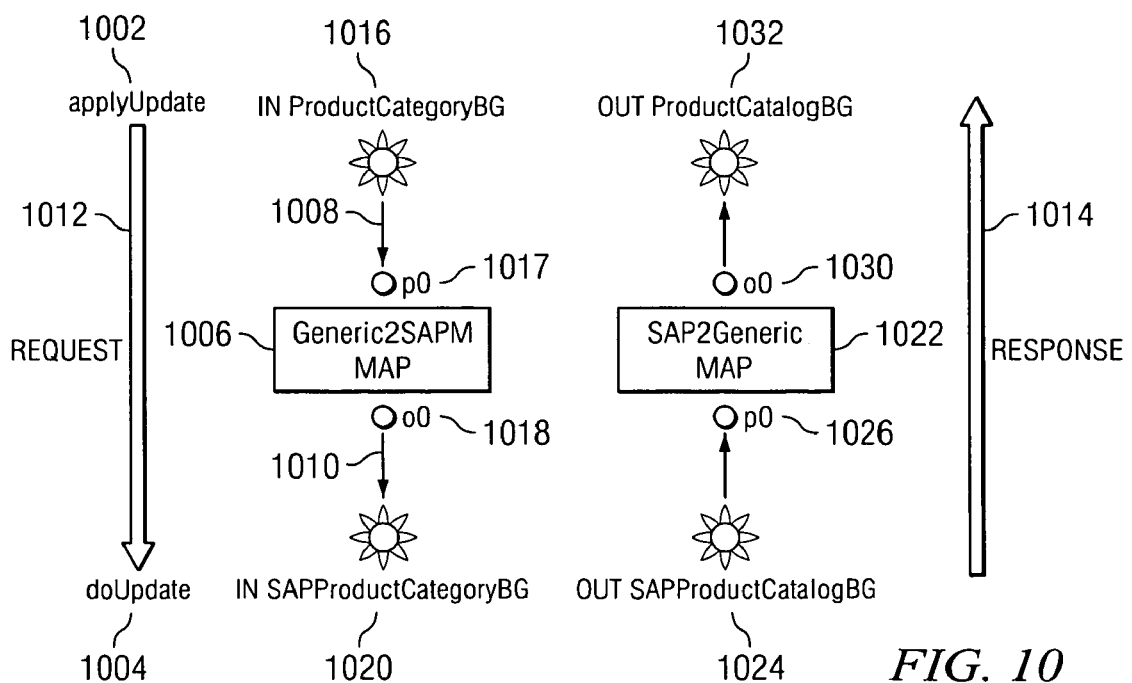
FIG. 10 is a diagram illustrating an exemplary BO (business object) transform mediation in accordance with an illustrative embodiment of the present invention.

FIG. 10 is a diagram illustrating an exemplary BO (business object) transform mediation in accordance with an illustrative embodiment of the present invention. This mediation is called a "BO" Transform as this type of parameter mediation is applicable to service data object (SDO) (both business object (BO) and business graph (BG)) parameters/faults. A BO transform mediation is employed whenever a map (as provided by the interface mediator) is required to transform one or more parameters and/or faults to one or more target parameters and/or faults. With BO transform, parameters/faults in the source/target operations are bound to the inputs/outputs of a map named as part of the parameter mediation specification. During runtime, the source input parameters bound to the input parameters of the map are transformed accordingly and the outputs of the map are then passed on as the target input parameters/faults to which the map outputs have been bound.

In this illustrative example, a single operation in a source component interface is mediated to a target component interface. The source operation name is applyUpdate 1002 and the target operation name is doUpdate 1004. To mediate this operation, a boTransform is performed using a map called Generic2SAPMap 1006. As shown, there are two parameter bindings (e.g., 1008, 1010) for each of request 1012 and response 1014.

For the request part of the operation, the input parameter (ProductCategoryBG 1016) from the source component operation is passed to input port p0 1017 of Generic2SAPMap 1006. Once the map processes the parameter, the output of the map is passed from output port o0 1018 of the map to the input parameter of the target component, SAPProductCategoryBG 1020.

For the response part of the operation, the output parameters are mediated. In this case, a different map, SAP2GenericMap 1022 is called by the interface mediation. The output parameter (SAPProductCatalogBG 1024) from the target component is passed to input port p0 1026 of map SAP2GenericMap 1022. Once the map processes this output parameter, the output of the map is taken from output port o0 1030 and passed to the source component output parameter named ProductCatalogBG 1032 to complete the mediation of the operation.

BO transform may contain parameter mediation restrictions, including requiring map inputs and outputs to be of the same type as the parameters/faults to which they have bound. In addition, one parameter may be bound to a particular input of a map. However, map output parameters may be bound to multiple target operation parameters. Thus, a single source input parameter/faults may be mediated to multiple target input parameters/faults through one or more map output ports. Multiple source input parameters/faults may be mediated to a single target input parameter/faults through multiple map input ports. Furthermore, all parameters bound to the input of a given map in a given BO Transform parameter mediation may be required to reside in the same operation (i.e., it is not allowed to have one map input from the source operation and another map input from the target operation). Likewise, all parameters bound to the output of the same map may be required to reside in the same operation. The parameters bound to the input of the map may also be required to reside in the same operation of the parameters bound to the output of the map. Moreover, map ports may not be bound to other map ports; they must be bound to parameters.

FIG. 11 illustrates how the exemplary BO transform mediation in FIG. 10 may be described in the IFM file in accordance with an illustrative embodiment of the present invention. In this illustrative example, the IFM file in FIG. 11 defines the operation binding and parameters for mediating source operation "applyUpdate" 1102 to target operation "doUpdate" 1104.

FIG. 12 is a diagram illustrating an exemplary pass through mediation in accordance with an illustrative embodiment of the present invention. A pass through parameter mediation is employed whenever a parameter/fault is required to be passed through unchanged from one operation to another. By necessity, the source and target parameters/faults are required to be of the same type.

In this illustrative example, a single operation in a source component interface is mediated to a target component interface. The source operation name is createOrder 1202 and the target operation name is generateOrder 1204. To mediate this operation, parameters are passed from the source component to the target component using pass through parameter mediation. In this example, there is one parameter binding (e.g., 1206) for each of request 1208 and response 1210.

For the request part of the operation, the input parameter (orderName 1212) from the source component operation is passed to the input parameter (orderNM 1214) of the target component.

For the response part of the operation, the output parameter (orderCD 1216) from the target component operation is passed to the output parameter (orderCode 1218) of the source component to complete the mediation of the operation.

Pass through mediation may contain parameter mediation restrictions, including requiring the types of the source and target parameters to match.

FIG. 13 illustrates how the pass through mediation in FIG. 12 may be described in the IFM file in accordance with an illustrative embodiment of the present invention. In this illustrative example, the IFM file in FIG. 13 defines the operation binding and parameters for mediating source operation "createOrder" 1302 to target operation "generateOrder" 1304. With the pass through mediation, the parameters get copied directly from the source component operation to the target component operation for the request and the reverse for the response.

FIG. 14 is a diagram illustrating an exemplary setValue mediation in accordance with an illustrative embodiment of the present invention. A setValue mediation may be employed when either (1) a constant value or (2) part of a DataObject needs to be copied to a certain input or output/fault parameter. With regard to the first scenario, a constant value may be specified in the IFM file and copied to the appropriate variable. The constant value may be copied to an input, output, or fault. At runtime, the variable specified in the "to" element (i.e., the parameter being bound) is inspected to determine the necessary type conversion.

In this illustrative example, a single operation in a source component interface is mediated to a target component interface. The source operation name is doOperation 1402 and the target operation name is performWork 1404. To mediate this operation, setValue parameter mediation is used. There is one parameter binding (e.g., 1406) for each of request 1408 and response 1410.

For the request part of the operation, a fixed value of '51' 1412 is copied to the input parameter (numRegions 1414) of the target component. No source input parameter values are used.

For the response part of the operation, the output parameter (results 1416) from the target component operation is processed by XPath processor 1418. The result of the XPath processing is copied to the output parameter (completionCode 1420) of the source component to complete the mediation of the operation.

SetValue mediation may contain parameter mediation restrictions, including supporting only primitive types, such as boolean, byte, double, int, long, float, short, and string when a constant value is applied in the from element. In addition, setValue mediation may support SDO types if a parameter in the originating operation is referenced and the value must correspond to an XPath operation performed on the referenced parameter and passed to the bound parameter.

FIG. 15 illustrates how the exemplary setValue mediation in FIG. 14 may be described in the IFM file in accordance with an illustrative embodiment of the present invention. In this illustrative example, the IFM file in FIG. 15 defines the operation binding and parameters for mediating source operation "output" to target operation "results". No source parameter is referenced in this example since a fixed value is passed to the target component. For example, the value '51' 1502 is copied to the input parameter, numRegions 1504. The constant value mediation in the request differs from the dataObject mediation in the response as defined by the location attribute in the IFM file. For example, the location attribute of the constant value mediation is equal to "intermediate" 1506 indicating a fixed value will be used. In the response, the location attribute is equal to "target" 1508, indicating an XPath query is used.

FIG. 16 is a diagram illustrating an exemplary Java snippet mediation in accordance with an illustrative embodiment of the present invention. Java snippets may be used to extend interface mediation so that arbitrary Java code may be introduced (or called out) when a parameter mediation is invoked according to the specification in an IFM file.

In this illustrative example, a single operation in a source component interface is mediated to a target component interface. The source operation name is processPayroll 1602 and the target operation name is handlePayment 1604. To mediate this operation, Java snippet parameter mediation is used. As shown, there is one parameter binding (e.g., 1606) for each of request 1608 and response 1610.

For the request part of the operation, a user-provided class Sample.TestJavaSnippetRequest 1612 is invoked to perform the mediation. The source component input parameter (empName 1614) is passed to the mediate method of the class and the result is copied to the target component input parameter (vendorInitials 1616).

For the response part of the operation, a user-provided class Sample.TestJavaSnippetResponse 1618 is invoked to perform the mediation. The output parameter (vendorCode 1620) from the target component operation is passed to the mediate method of the class. The result is copied to the output parameter (empCode 1622) of the source component to complete the mediation.

FIG. 17 illustrates how the exemplary Java snippet mediation in FIG. 16 may be described in the IFM file in accordance with an illustrative embodiment of the present invention. In this illustrative example, the mediation runtime may call the Java class sample.JavaSnippetTestRequest for mediating source operation "processPayroll" 1702 to target operation "handlePayment" 1704.

The interface mediator component may handle two types of interaction: synchronous and asynchronous. In a synchronous call, one component sends data to a second component and waits while the second component provides a response. In an asynchronous call, when a component sends data to a second component, the component does not have to wait for a response but instead is allowed to perform other actions. When interposed in the middle of an asynchronous request-response call, the interface mediation component ensures that request-response correlation is preserved, even across system failures. If the source component invokes the mediation component asynchronously, then the interface mediation component handles the message in a manner to ensure that the request and response will be handled properly even in the case of failures. For example, FIGS. 18-19 are interaction diagrams illustrating components involved for asynchronous calls to be handled through the interface mediation component for the request and the response in accordance with an illustrative embodiment of the present invention.

In the asynchronously processed request in FIG. 18, a single transaction is used for the entire request handling from reading the message from the source request queue and placing the request message in the target request queue. Message driven bean (MDB) 1802 reads the message from source request queue 1804, processes the message, and sends it to mediation component 1806. Mediation component 1806 stores the source request ticket and the ticket used to send the request to the target component in ticket database 1808 after invoking the target component, but within the same unit of work that the MDB was operating under, to allow the mediation component to correlate responses from the target component with a request from the source component. Mediation component 1806 stores the original business object for each business object parameter used in the source operation in ticket database 1808 along with the tickets for the requests, and places the request in the target request queue in a single unit of work. The original business object and the tickets may then be used during response processing.

In the asynchronously processed response in FIG. 19, a single transaction is used for the entire response handling from reading the message from the target response queue and placing the response message in the source response queue. MDB 1902 reads the message from target response queue 1904, processes the message, and sends it to mediation component 1906. Mediation component 1906 obtains the original source request ticket from ticket database 1908. Mediation component 1906 uses the original source request ticket to determine how to send the response to the source component. Mediation component 1906 removes the entry in ticket database 1908 as part of the same unit of work as MDB 1902 that invoked the mediation component for the response/fault, and obtains the original business object associated with a parameter from ticket database 1908. The original business object is sent as a parameter in the map call for the response/fault so that the relationship service may properly maintain the relationships.

FIG. 20 illustrates a mediation exception in accordance with an illustrative embodiment of the present invention. A mediation exception, such as MediationRuntimeException shown in FIG. 20, may be used by the mediation component kind whenever an unexpected condition occurs within the component. For example, if a map is called and it fails for some reason, the mediation component kind will throw the MediationRuntimeException. An exception is used to inform the caller that an unexpected error occurred and also provide details regarding the error.

Figure 21:
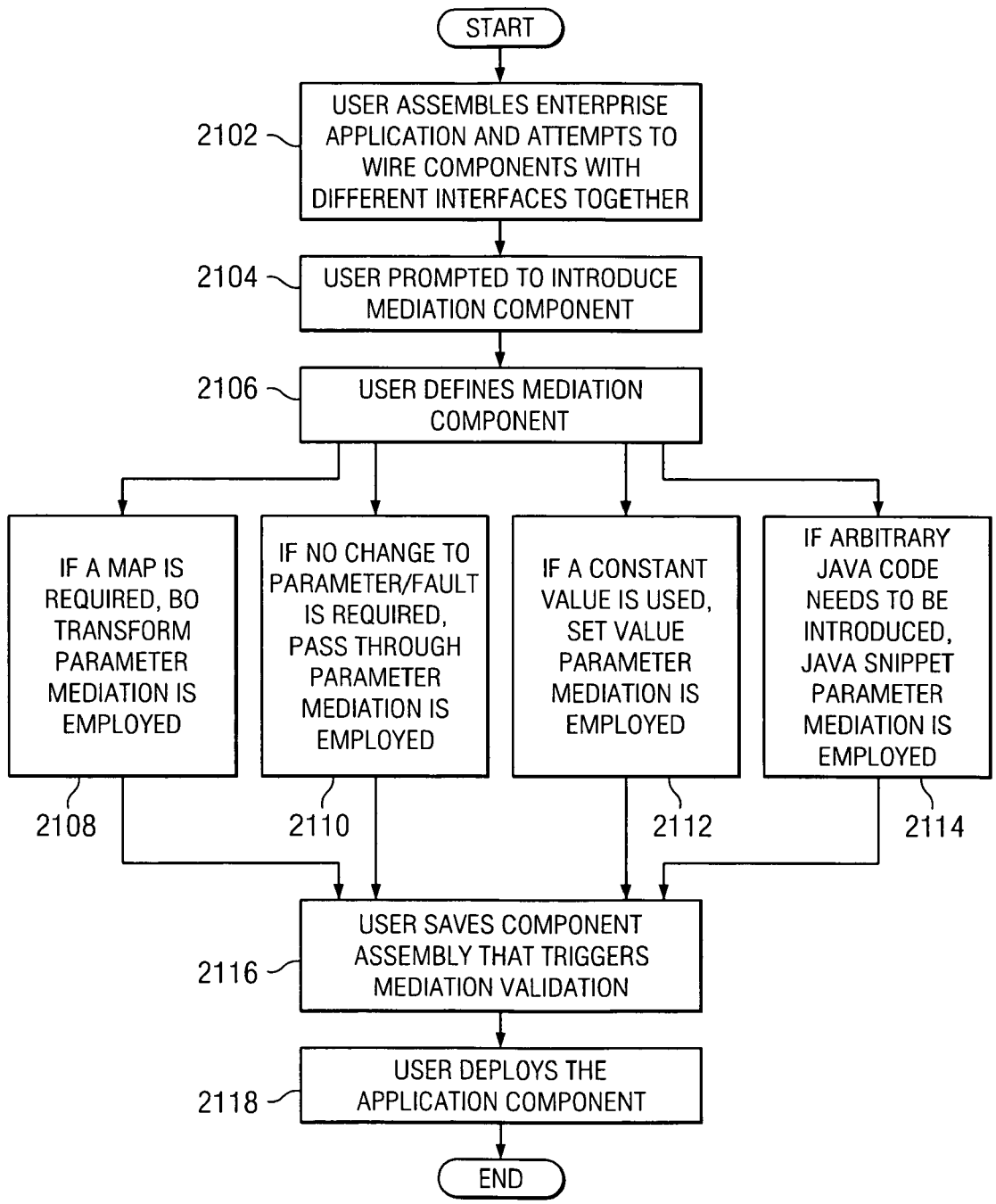
FIG. 21 is a flowchart of the process for integrating components with different interfaces in accordance with an illustrative embodiment of the present invention.

FIG. 21 is a flowchart of the process for integrating components with different interfaces in accordance with an illustrative embodiment of the present invention. The process described in FIG. 21 may occur when a user assembling an enterprise application attempts to wire two components together that have different interfaces.

The process begins with the user attempting to wire a component, such as OrderManager, to a component with a different interface, such as SAPAdapter (step 2102). In response, the user interface (UI) prompts the user to introduce a mediation component to enable the wiring (step 2104). The UI enables the user to define a mediation component whose interface matches the reference on OrderManager and whose reference matches the interface on SAPAdapter (step 2106).

The user may then define the mediation details based on the type of parameter mediation to be performed. When a map is required to transform parameters or faults to target parameters or faults, a BO Transform parameter mediation is employed (step 2108). If a parameter or fault is required to be passed through unchanged from one operation to another operation, a pass through parameter mediation is employed (step 2110). A setValue parameter mediation is used when a constant value or a part of a DataObject needs to be copied to a certain input or output/fault parameter (step 2112). A Java snippet is used to extend the interface mediation so that arbitrary Java code may be introduced or called out when a parameter mediation is invoked according to the specification in the IFM file (step 2114).

Once the mediation details are specified, the user may save the component assembly that triggers the mediation validation (step 2116). A mediation validator may define mediation specific problem markers and apply them to SCDL mediation and IFM files as appropriate. The mediation validator may recognize partially completed IFM files and 'lead' the user to completion with appropriate markers. The validator may enforce various rules, such as, for example, rules defining restrictions for each parameter binding type, whether maps and map ports bound correctly, if the bindings for operation and parameter are complete, and whether policies are applied correctly.

Any errors from the validation are reported to the user, and the user may correct the errors. The user may deploy the application component (step 2118), which is ready for processing data.

Thus, the present invention provides a mechanism for resolving and reconciling differences between interfaces found in components that are being integrated. The advantages of the present invention should be apparent in view of the description provided above. The interface mediation component of the present invention allows components that have incompatible interfaces to be wired together indirectly. Without the mediation component, a hand-coded component is required to be written by the user every time the user wants two incompatible components to communicate with each other. Furthermore, business users would be exposed to internal services for maps and relationships. The mechanism of the present invention solves the problems in the current art by providing a mediation component that allows for the integration of disparate components without the need for a user to write custom integration code.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for integrating components with different interfaces in an enterprise application integration environment, the method comprising:
responsive to an attempt to wire a first application component to a second application component, determining whether an interface reference on the first application component does not match an interface of the second application component; and
responsive to determining that the interface reference does not match the interface of the second application component, interposing an interface mediation component between the first and second application components to enable wiring of the first application component to the second application component, wherein the interface mediation component comprises an interface matching the interface reference on the first application component and an interface reference matching the interface on the second application component, and wherein the interface mediation component binds a first operation in the first application component to a second operation in the second application component and performs a parameter mediation of parameters in the first operation to parameters in the second operation.

2. The method of claim 1, further comprising:
validating the interface mediation component using predefined rules in a mediation validator.

3. The method of claim 1, wherein the interface mediation component is created using Service Component Declaration Language.

4. The method of claim 1, wherein the interface mediation component references an interface mediation file, and wherein the interface mediation file conforms to a schema that defines a set of rules for operation bindings and parameter mediations.

5. The method of claim 4, wherein the interface mediation file is an extensible markup language file.

6. The method of claim 4, wherein the schema is an extensible markup language schema.

7. The method of claim 4, wherein the interface mediation file specifies operations and parameters to mediate, operation and parameter bindings, type of parameter mediation, and map input and output ports to use for a mediation.

8. The method of claim 1, wherein the parameter mediation comprises invoking a mapping service to transform parameters from the first application component to the second application component.

9. The method of claim 1, wherein the parameter mediation comprises passing parameters unchanged from the first application component to the second application component.

10. The method of claim 1, wherein the parameter mediation comprises passing a fixed value from the interface mediation component to the second application component.

11. The method of claim 1, wherein the parameter mediation comprises using an XPath processor to process a parameter from the first application component to the second application component.

12. The method of claim 1, wherein the parameter mediation comprises using Java snippets to transform parameters from the first application component to the second application component.

13. A data processing system for integrating components with different interfaces in an enterprise application integration environment, the data processing system comprising:
determining means for determining whether an interface reference on the first application component does not match the interface of the second application component in response to an attempt to wire a first application component to a second application component; and
interposing means for interposing an interface mediation component between the first and second application components to enable wiring of the first application component to the second application component in response to determining that the interface does not match an interface of the second application component, wherein the interface mediation component comprises the interface matching an interface reference on the first application component and an interface reference matching the interface on the second application component, and wherein the interface mediation component binds a first operation in the first application component to a second operation in the second application component and performs a parameter mediation of parameters in the first operation to parameters in the second operation.

14. The data processing system of claim 13, further comprising:
validating the interface mediation component using predefined rules in a mediation validator.

15. The data processing system of claim 13, wherein the interface mediation component is created using Service Component Declaration Language.

16. The data processing system of claim 13, wherein the interface mediation component references an interface mediation file, and wherein the interface mediation file conforms to a schema that defines a set of rules for operation bindings and parameter mediations.

17. The data processing system of claim 16, wherein the interface mediation file is an extensible markup language file.

18. The data processing system of claim 16, wherein the schema is an extensible markup language schema.

19. The data processing system of claim 16, wherein the interface mediation file specifies operations and parameters to mediate, operation and parameter bindings, type of parameter mediation, and map input and output ports to use for a mediation.

20. The data processing system of claim 13, wherein the parameter mediation comprises invoking a mapping service to transform parameters from the first application component to the second application component.

21. The data processing system of claim 13, wherein the parameter mediation comprises passing parameters unchanged from the first application component to the second application component.

22. The data processing system of claim 13, wherein the parameter mediation comprises passing a fixed value from the interface mediation component to the second application component.

23. The data processing system of claim 13, wherein the parameter mediation comprises using an XPath processor to process a parameter from the first application component to the second application component.

24. The data processing system of claim 13, wherein the parameter mediation comprises using Java snippets to transform parameters from the first application component to the second application component.

25. A computer program product stored on a recordable-type computer useable medium for integrating components with different interfaces in an enterprise application integration environment, the computer program product comprising:

computer useable program code for determining whether an interface reference on the first application component does not match the interface of the second application component in response to an attempt to wire a first application component to a second application component; and computer useable program code for interposing an interface mediation component between the first and second application components to enable wiring of the first application component to the second application component in response to determining that the interface does not match an interface of the second application component, wherein the interface mediation component comprises the interface matching an interface reference on the first application component and an interface reference matching the interface on the second application component, and wherein the interface mediation component binds a first operation in the first application component to a second operation in the second application component and performs a parameter mediation of parameters in the first operation to parameters in the second operation.

26. The computer program product of claim 25, further comprising:

computer useable program code for validating the interface mediation component using pre-defined rules in a mediation validator.

27. The computer program product of claim 25, wherein the interface mediation component is created using Service Component Declaration Language.

28. The computer program product of claim 25, wherein the interface mediation component references an interface mediation file, and wherein the interface mediation file conforms to a schema that defines a set of rules for operation bindings and parameter mediations.

29. The computer program product of claim 25, wherein the interface mediation file is an extensible markup language file.

30. The computer program product of claim 25, wherein the schema is an extensible markup language schema.

31. The computer program product of claim 25, wherein the interface mediation file specifies operations and parameters to mediate, operation and parameter bindings, type of parameter mediation, and map input and output ports to use for a mediation.

32. The computer program product of claim 25, wherein the parameter mediation comprises invoking a mapping service to transform parameters from the first application component to the second application component.

33. The computer program product of claim 25, wherein the parameter mediation comprises passing parameters unchanged from the first application component to the second application component.

34. The computer program product of claim 25, wherein the parameter mediation comprises passing a fixed value from the interface mediation component to the second application component.

35. The computer program product of claim 25, wherein the parameter mediation comprises using an XPath processor to process a parameter from the first application component to the second application component.

36. The computer program product of claim 25, wherein the parameter mediation comprises using Java snippets to transform parameters from the first application component to the second application component.

* * * * *

UNITED STATES PATENT AND TRADEMARK OFFICE
CERTIFICATE OF CORRECTION

PATENT NO. : 7,617,500 B2
APPLICATION NO. : 11/133929
DATED : November 10, 2009
INVENTOR(S) : Astl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 944 days.

Signed and Sealed this

Nineteenth Day of October, 2010

David J. Kappos
*Director of the United States Patent and Trademark Office*